US008378611B2

United States Patent
Tong et al.

(10) Patent No.: US 8,378,611 B2
(45) Date of Patent: Feb. 19, 2013

(54) COMPUTER FAN ALARM CIRCUIT

(75) Inventors: Song-Lin Tong, Shenzhen (CN);
Hai-Qing Zhou, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 364 days.

(21) Appl. No.: 12/837,437

(22) Filed: Jul. 15, 2010

(65) Prior Publication Data

US 2011/0221373 A1  Sep. 15, 2011

(30) Foreign Application Priority Data

Mar. 12, 2010  (CN) .......................... 2010 1 0123857

(51) Int. Cl.
*H02H 3/00* (2006.01)

(52) U.S. Cl. .................. 318/490; 318/400.12; 318/461; 324/500; 324/511; 361/187; 361/56; 361/527; 361/679.48; 361/679.01; 361/688

(58) Field of Classification Search .................. 318/490, 318/400.12, 461, 400.04; 323/201, 204; 324/500, 511, 522; 361/187, 56, 527, 679.48, 361/679.01, 688
See application file for complete search history.

(56) References Cited

U.S. PATENT DOCUMENTS

| | | | | |
|---|---|---|---|---|
| 4,644,238 A * | 2/1987 | Hirosaki | ....................... | 388/816 |
| 5,132,628 A * | 7/1992 | Matsuo | ........................ | 324/511 |
| 5,436,827 A * | 7/1995 | Gunn et al. | ..................... | 700/82 |
| 5,764,506 A * | 6/1998 | Eynaud | .......................... | 700/12 |
| 5,831,405 A * | 11/1998 | Massie | .......................... | 318/471 |
| 6,054,823 A * | 4/2000 | Collings et al. | ......... | 318/400.04 |
| 6,268,664 B1 * | 7/2001 | Rolls et al. | ...................... | 307/32 |
| 6,289,449 B1 * | 9/2001 | Aguilar et al. | .................... | 713/2 |
| 6,528,987 B1 * | 3/2003 | Blake et al. | ................... | 324/168 |
| 6,750,562 B2 * | 6/2004 | Rolls et al. | ...................... | 307/32 |
| 6,965,208 B2 * | 11/2005 | Chen | ............................ | 318/490 |
| 7,323,837 B2 * | 1/2008 | Wang | ........................... | 318/268 |
| 7,550,936 B2 * | 6/2009 | Kurita | ........................... | 318/255 |
| 7,791,301 B2 * | 9/2010 | Huang et al. | .................. | 318/473 |
| 8,190,396 B2 * | 5/2012 | Yanao | ........................... | 702/183 |
| 2002/0063476 A1 * | 5/2002 | Rolls et al. | .................... | 307/117 |
| 2007/0133170 A1 * | 6/2007 | Yang | ............................ | 361/699 |
| 2010/0225263 A1 * | 9/2010 | Mishima | ....................... | 318/430 |
| 2012/0030493 A1 * | 2/2012 | Cepulis et al. | ................ | 713/324 |

* cited by examiner

*Primary Examiner* — Rita Leykin
(74) *Attorney, Agent, or Firm* — Altis Law Group, Inc.

(57) ABSTRACT

A circuit for alarming abnormal state of a computer fan includes a detection circuit coupled to the computer fan, a controller coupled to the detection circuit and the computer fan, an alarm unit coupled to the controller. The detection circuit detects a power source and a speed control signal received by the computer fan, the controller determines the work state of the computer fan according to the power source, the speed control signal, and a speed signal received from the computer fan and raises an alarm through the alarm unit if the computer fan is not working normally.

16 Claims, 2 Drawing Sheets

COMPUTER FAN ALARM CIRCUIT

BACKGROUND

1. Technical Field

The present disclosure relates to alarm circuits, and particularly, to an alarm circuit capable of alerting users to an abnormal state of a computer fan.

2. Description of Related Art

Generally, a computer includes a motherboard with various electronic elements mounted thereon. Many of these electronic elements generate heat when the computer is operating. Normally, the computer uses one or more fans to dissipate the heat from the electronic elements.

However, the fan may malfunction and stop working For example, a blade of the fan may be jammed by some obstruction, a poor electrical connection between the fan and its power source, or a motor of the fan may be damaged. In the event of any of the above situations, the heat in the computer cannot be dissipated timely and the performance of the computer will be compromised.

Therefore, it is desirable to provide an alarm circuit which can warn a user about an abnormal state of a computer fan.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the disclosure are now described in detail with reference to the drawings.

Figure 1:
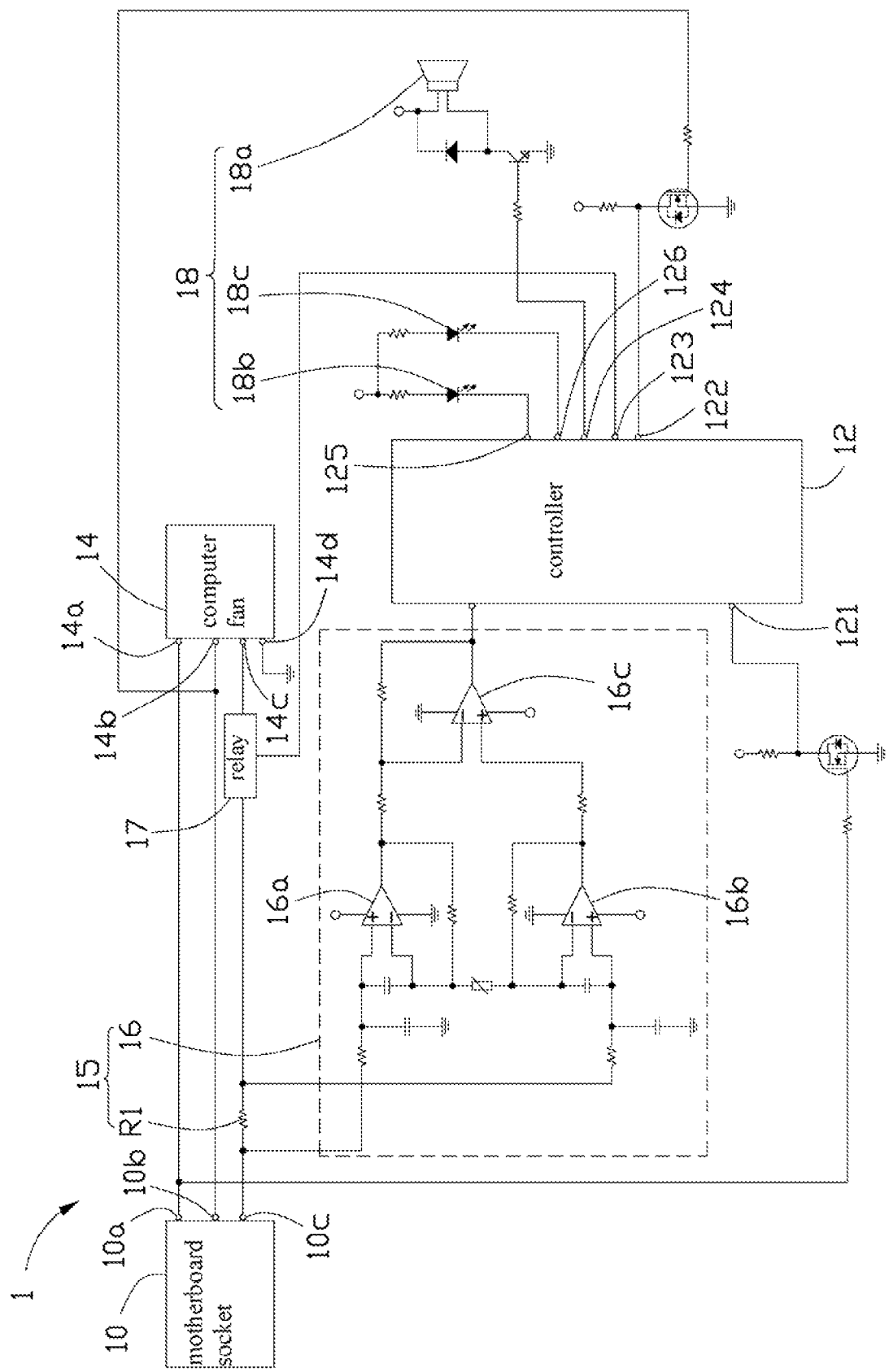
FIG. 1 is a diagram of an alarm circuit for a computer fan in accordance with an exemplary embodiment.

Referring to FIG. 1, an alarm circuit 1 for warning an abnormal state of a computer fan 14, according to an exemplary embodiment, is illustrated. The computer fan 14 is connected to a motherboard socket 10. The motherboard socket 10 provides a power source and a speed control signal to drive the computer fan 14 and the computer fan 14 feeds back a speed signal to the motherboard socket 10.

The alarm circuit 1 includes a controller 12, a detection circuit 15, a relay 17, and an alarm unit 18.

The computer fan 14 includes a control pin 14a, a detecting pin 14b, a power pin 14c, and a grounded pin 14d. The control pin 14a is configured to receive the speed control signal from the motherboard socket 10. The power pin 14c is configured to receive a power source from the motherboard socket 10. The computer fan 14 feeds back the speed signal to the motherboard socket 10 through the detecting pin 14b. The speed signal corresponds to an actual rotation speed of the computer fan 14.

The motherboard socket 10 includes a control terminal 10a, a detecting terminal 10b, and a power terminal 10c. The power terminal 10c connects to the power pin 14c through the relay 17 to transmit the power source from a motherboard to the computer fan 14. The control terminal 10a connects to the control pin 14a to transmit the speed control signal from the motherboard to the computer fan 14. The speed control signal is a pulse width modulation (PWM) signal. The computer fan 14 increases or decreases the rotation speed according to a duty cycle of the speed control signal. The detecting terminal 10b connects to the detecting pin 14b to receive the speed signal.

The detection circuit 15 is configured to detect the power source received by the computer fan 14. The detection circuit 15 includes a sampling resistor R1 and a differential amplifier circuit 16. The sampling resistor R1 is coupled in series between the power terminal 10c and the power pin 14c.

The differential amplifying circuit 16 is configured to amplify the power source across the sampling resistor. The differential amplifying circuit 16 includes a first operational amplifier 16a, a second operational amplifier 16b, and a third operational amplifier 16c. An inverting input terminal (−) of the first operational amplifier 16a is coupled to an inverting input terminal (−) of the second operational amplifier 16b. A non-inverting input terminal (+) of the first operational amplifier 16a and a non-inverting input terminal (+) of the second operational amplifier 16b are correspondingly coupled to opposite ends of the sampling resistor R1. An output terminal of the first operational amplifier 16a and an output terminal of the second operational amplifier 16b are correspondingly coupled to a non-inverting input terminal (+) and an inverting input terminal (−) of the third operational amplifier 16c. An output terminal of the third operational amplifier 16c is coupled to the controller 12. The power source across the sampling resistor R1 is amplified by the differential amplifying circuit 16 and outputted to the controller 12 through the output terminal of the third operational amplifier 16c.

Figure 2:
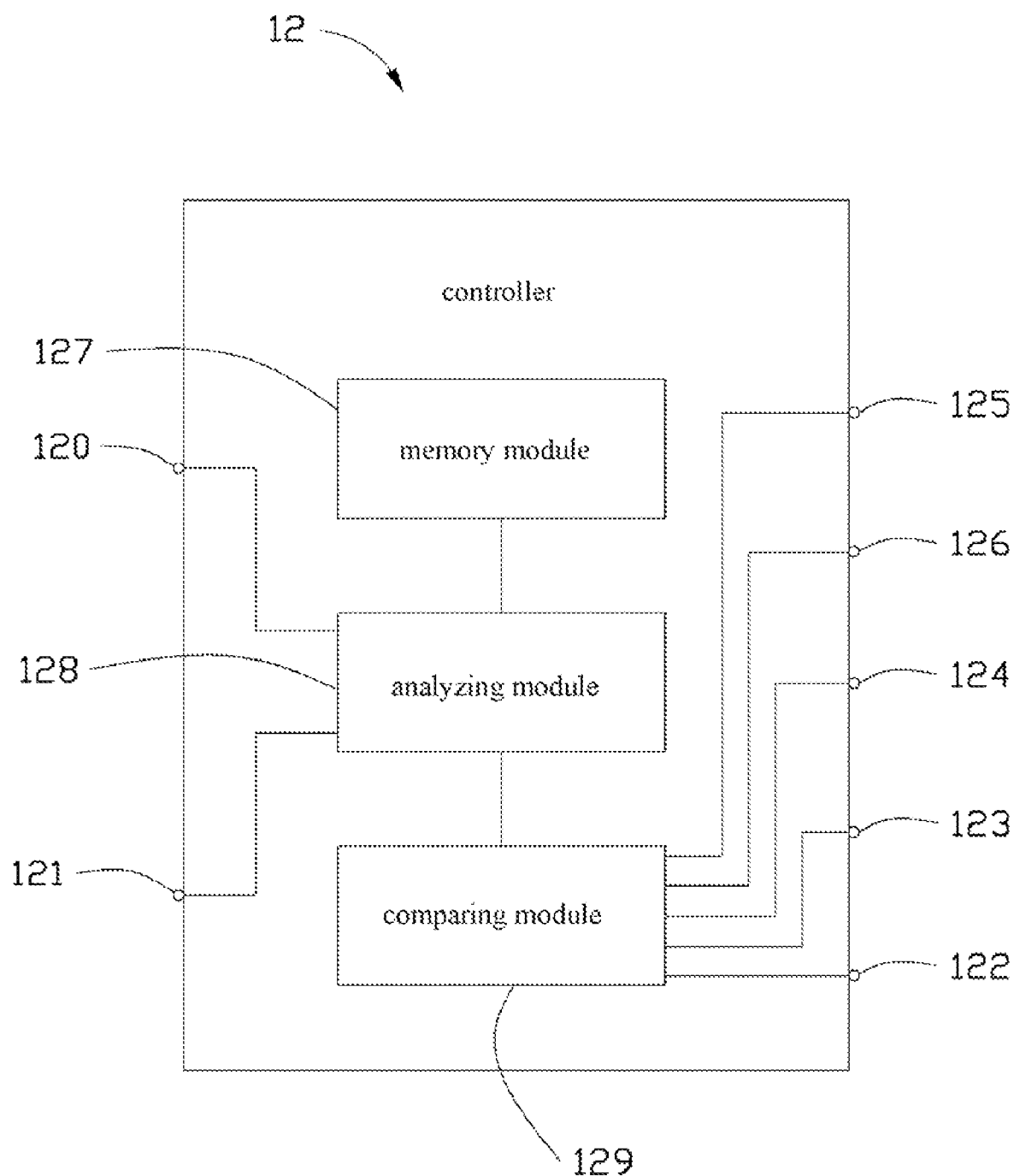
FIG. 2 is a function block diagram of one embodiment of a controller in FIG. 1.

Also referring to FIG. 2, the controller 12 includes a first detecting terminal 120, a second detecting terminal 121, a third detecting terminal 122, a first output terminal 123, a second output terminal 124, a third output terminal 125, and a fourth output terminal 126. The first detecting terminal 120 is coupled to the output terminal of the third operational amplifier 16c and configured to detect the amplified power source. The second detecting terminal 121 is coupled to the control terminal 10a and configured to detect the speed control signal. The third detecting terminal 122 is coupled to the detecting pin 14b and configured to detect the speed signal feed backed from the computer fan 14 which represents an actual rotation speed of the computer fan 14. The first output terminal 123 is coupled to the relay 17.

The controller 12 further includes a memory module 127, an analyzing module 128, and a comparing module 129. The memory module 127 is configured to store relationship data about the power source, the speed control signal, and a corresponding normal speed range. The analyzing module 128 connects to the memory module 127, the first detecting terminal 120, and the second detecting terminal 121. The analyzing module 128 is configured to calculate the normal speed range of the computer fan 14 according to the relationship data stored in the memory module 127. The comparing module 129 connects to the analyzing module 128, the third detecting terminal 122, the first output terminal 123, the second output terminal 124, the third output terminal 125, and the fourth output terminal 126. The comparing module 129 is configured to receive the normal speed range from the analyzing module 128 and the speed signal from the computer fan 14 and compare the normal speed range with the speed signal to generate a control signal according to the comparison.

It is to be understood that the relationship data stored in the memory module 127 can be a predetermined formula used to calculate the normal speed range of the computer fan 14 according to the power source and the speed control signal.

Alternatively, the relationship data may be a look up table (LUT) consisting of the power source, the speed control signal, and the corresponding normal speed range. Therefore, the analyzing module 128 can calculate the normal speed range using the formula or look up the normal speed range in the LUT according to the power source and the speed control signal.

The alarm unit 18 includes a buzzer 18a, a first illuminating device 18b, and a second illuminating device 18c. The buzzer 18a is coupled to the second output terminal 124. The first illuminating device 18b is coupled to the third output terminal 125. The second illuminating device 18c is coupled to the fourth output terminal 126.

In one embodiment, the analyzing module 128 calculates the normal speed range according to the power source and the speed control signal. The comparing module 129 compares the speed signal of the computer fan 14 with the normal speed range. If an actual rotation speed represented by the speed signal of the computer fan 14 is located in the normal speed range, the comparing module 129 generates a normal working signal to turn on the first illuminating device 18b through the third output terminal 125. Therefore, the first illuminating device 18b illuminates to indicate the computer fan 14 is operating normally.

If the actual rotation speed falls below the normal speed range, the comparing module 129 generates an abnormal working signal to turn on the second illuminating device 18c through the fourth output terminal 126. The second illuminating device 18c to indicate the computer fan 14 is not operating normally. At the same time, the comparing module 129 transmits a cut off signal to the relay 17 through the first output terminal 123. The relay 17 cut off the electrical connection between the power terminal 10c and the power pin 14c to prevent the computer fan 14 from damage. The comparing module 129 also generates and transmits an alarming signal to the buzzer 18a through the second output terminal 124. The buzzer 18a sounds an alarm when it receives the alarm signal.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An alarm circuit to alarm abnormal state of a computer fan, the computer fan connected to a motherboard socket, the motherboard socket comprising a power terminal, a control terminal, and a detecting terminal, the computer fan comprising a power pin, a control pin, and a detecting pin, the power terminal connecting to the power pin to provide a power source to the computer fan, the control terminal connecting to the control pin to provide a speed control signal to drive the computer fan, the detecting terminal connecting to the detecting pin to receive a speed signal fed back from the computer fan, the alarm circuit comprising:

a detection circuit that detects the power source provided to the computer fan;
    a controller coupled to the detection circuit to receive the power source detected by the detection circuit and coupled to the motherboard socket to receive the speed control signal, the controller also coupled to the computer fan to receive the speed signal;
    an alarm unit coupled to the controller; and
    a relay coupled to between the power terminal and the power pin;
    wherein the controller generates a normal speed range according to the power source data and the speed control signal, and compares the normal speed range with the speed signal to determine if the computer fan works in an abnormal state, the controller further comprises a first output terminal coupled to the relay to transmit a cut off signal to the relay when the computer fan works in an abnormal state, the relay cuts off the power source provided to the computer fan to protect the computer fan when receives the cut off signal, the alarm unit sounds an alarm when the computer fan works in an abnormal state.

2. The alarm circuit as claimed in claim 1, wherein the speed control signal is a pulse width modulation (PWM) signal, the computer fan increases or decreases the rotation speed according to the duty cycle of the speed control signal.

3. The alarm circuit as claimed in claim 1, wherein the detection circuit comprises a sampling resistor and a differential amplifier circuit, the sampling resistor is coupled in series between the power terminal and the power pin, the differential amplifying circuit comprises a first operational amplifier, a second operational amplifier, and a third operational amplifier, an inverting input terminal of the first operational amplifier is coupled to an inverting input terminal of the second operational amplifier, a non-inverting input terminal of the first operational amplifier and a non-inverting input terminal of the second operational amplifier are correspondingly coupled to the opposite ends of the sampling resistor, an output terminal of the first operational amplifier and an output terminal of the second operational amplifier are correspondingly coupled to a non-inverting input terminal and a inverting input terminal of the third operational amplifier, an output terminal of the third operational amplifier is coupled to the controller.

4. The alarm circuit as claimed in claim 3, wherein the controller comprises a first detecting terminal, a second detecting terminal, and a third detecting terminal, the first detecting terminal is coupled to the output terminal of the third operational amplifier and configured to detect the power source, the second detecting terminal is coupled to the control terminal and configured to detect the speed control signal, the third detecting terminal is coupled to the detecting pin and configured to detect the speed signal from the computer fan.

5. The alarm circuit as claimed in claim 4, wherein the controller further comprises:

a memory module configured to store relationship data about the power source, the speed control signal, and the normal speed range;
    an analyzing connecting to the memory module, the first detecting terminal, and the second detecting terminal and configured to calculate the normal speed range of the computer fan according to the relationship data stored in the memory module;
    a comparing module connecting to the analyzing module and the third detecting terminal module and configured to compares the normal speed range with the speed signal to generate a control signal.

6. The alarm circuit as claimed in claim 5, wherein the controller further comprises a second output terminal, the alarm unit comprises a buzzer coupled to the second output terminal, the comparing module generates and transmits an alarming signal to the buzzer through the second output terminal when the computer fan works in an abnormal state, the buzzer sounds an alarm when receives the alarming signal.

7. The alarm circuit as claimed in claim 5, wherein the alarming circuit further comprises a third output terminal, the alarm unit comprises a first illuminating device coupled to the third output terminal, the comparing module transmits a normal working signal to turn on the first illuminating device through the third output terminal when the computer fan normally works.

8. The alarm circuit as claimed in claim 5, wherein the alarming circuit further comprises a fourth output terminal, the alarm unit comprises a second illuminating device coupled to the fourth output terminal, the comparing module generates an abnormal working signal to turn on the second illuminating device through the fourth output terminal.

9. The alarm circuit as claimed in claim 5, wherein the relationship data stored in the memory module is a predetermined formula capable of calculating the normal speed range of the computer fan according to the power source and the speed control signal, the analyzing module calculates the normal speed range through the formula.

10. The alarm circuit as claimed in claim 5, wherein the relationship data is a look up table (LUT) consists of the power source, the speed control signal, and the normal speed range, the analyzing module indexes the normal speed range from the LUT according to the power source and the speed control signal.

11. An alarm circuit to alarm abnormal state of a computer fan, the computer fan connected to a motherboard socket, the motherboard socket providing a power source and a speed control signal to drive the computer fan, the computer fan feeding back a speed signal to the motherboard socket, the alarm circuit comprising:
a detection circuit that detects the power source provided to the computer fan;
a controller coupled to the detection circuit to receive the power source detected by the detection circuit and coupled to the motherboard socket to receive the speed control signal, the controller also coupled to the computer fan to receive the speed signal; and
an alarm unit coupled to the controller;
wherein the controller generates a normal speed range according to the power source data and the speed control signal, and compares the normal speed range with the speed signal to determine if the computer fan works in an abnormal state, the alarm unit sounds an alarm when the computer fan works in an abnormal state, the motherboard socket comprises a power terminal, the computer fan comprises a power pin, the power terminal connects to the power pin to provide the power source to the computer fan, the detection circuit comprises a sampling resistor and a differential amplifier circuit, the sampling resistor is coupled in series between the power terminal and the power pin, the differential amplifying circuit comprises a first operational amplifier, a second operational amplifier, and a third operational amplifier, an inverting input terminal of the first operational amplifier is coupled to an inverting input terminal of the second operational amplifier, a non-inverting input terminal of the first operational amplifier and a non-inverting input terminal of the second operational amplifier are correspondingly coupled to the opposite ends of the sampling resistor, an output terminal of the first operational amplifier and an output terminal of the second operational amplifier are correspondingly coupled to a non-inverting input terminal and a inverting input terminal of the third operational amplifier, an output terminal of the third operational amplifier is coupled to the controller, the controller comprises a first detecting terminal, a second detecting terminal, and a third detecting terminal, the first detecting terminal is coupled to the output terminal of the third operational amplifier and configured to detect the power source, the second detecting terminal is coupled to the control terminal and configured to detect the speed control signal, the third detecting terminal is coupled to the detecting pin and configured to detect the speed signal from the computer fan, the controller further comprises a memory module configured to store relationship data about the power source, the speed control signal, and the normal speed range, an analyzing connecting to the memory module, the first detecting terminal, and the second detecting terminal and configured to calculate the normal speed range of the computer fan according to the relationship data stored in the memory module, and a comparing module connecting to the analyzing module and the third detecting terminal module and configured to compares the normal speed range with the speed signal to generate a control signal, the alarm circuit further comprises a relay coupled to between the power terminal and the power pin, the controller further comprises a first output terminal coupled to the relay to transmit a cut off signal to the relay when the computer fan works in an abnormal state, the relay cuts off the power source provided to the computer fan to protect the computer fan when receives the cut off signal.

12. The alarm circuit as claimed in claim 11, wherein the controller further comprises a second output terminal, the alarm unit comprises a buzzer coupled to the second output terminal, the comparing module generates and transmits an alarming signal to the buzzer through the second output terminal when the computer fan works in an abnormal state, the buzzer sounds an alarm when receives the alarming signal.

13. The alarm circuit as claimed in claim 11, wherein the alarming circuit further comprises a third output terminal, the alarm unit comprises a first illuminating device coupled to the third output terminal, the comparing module transmits a normal working signal to turn on the first illuminating device through the third output terminal when the computer fan normally works.

14. The alarm circuit as claimed in claim 11, wherein the alarming circuit further comprises a fourth output terminal, the alarm unit comprises a second illuminating device coupled to the fourth output terminal, the comparing module generates an abnormal working signal to turn on the second illuminating device through the fourth output terminal.

15. The alarm circuit as claimed in claim 11, wherein the relationship data stored in the memory module is a predetermined formula capable of calculating the normal speed range of the computer fan according to the power source and the speed control signal, the analyzing module calculates the normal speed range through the formula.

16. The alarm circuit as claimed in claim 11, wherein the relationship data is a look up table (LUT) consists of the power source, the speed control signal, and the normal speed range, the analyzing module indexes the normal speed range from the LUT according to the power source and the speed control signal.

* * * * *